2,710,865

PRODUCTION OF PYRAZINE-2,3 DICARBOXYLIC ACID

Thomas Rees, Plainfield, N. J., assignor to American Cyanamid Company, New York, N. Y., a corporation of Maine No Drawing. Application June 10, 1953,
Serial No. 360,840

18 Claims. (Cl. 260—250)

This invention relates to an improved process of obtaining pyrazine-2,3-dicarboxylic acid.

Pyrazine-2,3-dicarboxylic acid is ordinarily prepared by oxidizing quinoxaline with permanganate and recovering the acid therefrom. This recovery step has presented a serious problem. One process involved evaporation of the oxidation liquors to dryness and extraction of the residue with organic solvents after acidification. This procedure is objectionable both from the standpoint of cost and from the fact that the acid is relatively easily decomposed, and the lengthy evaporations result in undesirable side reactions. Another method which has been proposed is to form the silver or barium salt of pyrazine-2,3-dicarboxylic acid and regenerating therefrom the free acid in dilute solution by the introduction of acids which form with the metal insoluble compounds, for example, hydrogen sulfide or hydrochloric acid in the case of the silver salt, or sulfuric acid in the case of barium. A dilute solution of the acid in water is then removed from the precipitated silver or barium salts and concentrated. This involves additional cost, the silver and barium salts must be regenerated at considerable expense and the production of the acid in dilute solution requiring evaporation introduces the possibility of decomposition of the sensitive compound.

The present invention is based on a procedure which is substantially the reverse of the recovery process from silver and barium salts referred to above. Here a salt of a metal of group 2 of the periodic system is prepared. A concentrated slurry in water is produced and then this is treated without dilution with an acid which does not form insoluble salts with the metal. As a result, the salts of the metals remain in solution and in the concentrated reaction medium the sparingly soluble free acid precipitates out and can be recovered by filtration. No evaporation is necessary, no decomposition due to heating results, and a good yield of the acid is obtained in a state of satisfactory purity for use as a pharmaceutical intermediate. It is a further advantage of the present invention that the solution of the salts of the metals can be reused or recycled in order to produce further amounts of salts of pyrazine-2,3-dicarboxylic acid. This further increases the yield and makes it unnecessary to provide fresh salts which reduces still further the cost.

While any metal of group 2 of the periodic system may serve as the cation of the salt, I have found that calcium and magnesium are preferable to either zinc or barium. They give the maximum yields and require less acid in the neutralization step.

The particular acid used for transforming the salts to the free acid is not critical so long as it is sufficiently strong and does not form insoluble salts with the metal. Any of the strong mineral acids meeting this requirement are useful. Hydrochloric acid in general is preferable, both by reason of its cheapness and its efficiency. Nitric acid may also be used and so can sulfuric acid in the case of magnesium salts. Of course sulfuric acid is not suitable with salts of barium, strontium and calcium. Weaker acids, such as for example, phosphoric acid and acetic acid cannot be used.

The concentration of the slurry is not critical, but of course the amount of water must be sufficiently small so that there are not excessive losses of pyrazine-2,3-dicarboxylic acids in the mother liquors. Even when the latter are recycled, it is desirable to keep the amount of pyrazine-2,3-dicarboxylic acid which they contain down to a minimum. The other extreme for slurry concentration is by the minimum amount of water which will dissolve this salt of the acid used in neutralization. This will vary somewhat with the salt, for example, when hydrochloric acid is used a very concentrated slurry can be employed in the case of calcium salts because of the very great solubility of calcium chloride. It is an advantage that the concentration of the slurry is in no sense critical and does not require excessively careful control.

Broadly, it does not make any particular difference how the slurry of the group 2 metal salt of pyrazine-2,3-dicarboxylic acid is produced. The advantages of the present invention are retained regardless of the past history of the slurry. However, in a more specific aspect of the invention, it is advantageous to produce the slurry from the reaction medium of the oxidation step, that is to say, the permanganate liquors after removal of the manganese dioxide sludge. The slurry thus obtained is of course not as pure as one made from water and the recovered group 2 metal salt. However, it eliminates purification steps and it is an advantage of the present invention that even using an impure slurry of this type the process proceeds smoothly to give a high-grade product in the form of the free pyrazine-2,3-dicarboxylic acid. Because of the economies effected by working with the permanganate liquors, this constitutes a preferred embodiment of the invention.

The invention will be described in greater detail in conjunction with the following specific examples, in which the parts are by weight unless otherwise specified.

Example 1

171 parts of the calcium salt of pyrazine-2,3-dicarboxylic acid was slurried in 400 parts of water at 30° C. and 140 parts of concentrated hydrochloric acid added. The calcium salt dissolved except where a small amount of impurity which was removed by filtration adding sufficient filter aid to make the filtrations rapid. The filtrate which was supersaturated with respect to pyrazine-2,3-dicarboxylic acid was then inoculated with a trace of the solid acid to initiate crystallization. The temperature was dropped to about 0° C. and maintained at this temperature until crystallization was complete whereupon it was filtered at the same low temperature and washed with a small amount of ice water. A good yield of crude acid was obtained which was purified by recrystallization from water.

Example 2

64 parts of quinoxaline was oxidized at 80–85° C. with 472 parts of potassium permanganate in 1264 parts of water. The reaction being exothermic, cooling was required to maintain the temperature at the point indicated. When oxidation was complete, the sludge of manganese dioxide formed was filtered off and washed with water giving a total weight of filtrate and wash of 2110 parts. 100 parts of concentrated hydrochloric acid was then added and 165 parts of solid calcium chloride. The solution was then neutralized with concentrated ammonia to produce the crude calcium salt and filtered. The calcium salt was then slurried in 181 parts of water, 63 parts of concentrated hydrochloric acid added. The precipitate dissolved except for a very small amount of milky suspended material. Crystallization was then initiated and the mixture maintained at 3° C. until crystallization was complete. Thereupon it was filtered, washed with 25 parts of water at 0° C. and sucked dry on the filter. The combined mother liquor and wash were retained for reuse as prescribed below.

The precipitate was dissolved in 61 parts of water at 75° C. and filtered through a bed of filter aid to remove slight turbidity, followed by washing with 5 parts of hot water. The filtrate and wash was chilled at 3° C., precipitated and filtered off by suction. The precipitate was then washed with 25 parts of water at 2° C. and sucked dry. The filtrate and washed mother liquor being likewise retained for further use. The precipitate was dried at room temperature until the water of crystallization had effloresced and constituted pyrazine-2,3-dicarboxylic acid.

57.4 parts of quinoxaline was oxidized by the method described in the beginning of this example and the first mother liquor added to the oxidation liquor followed by 73 parts of concentrated hydrochloric acid. The mixture was warmed and stirred until effervescence ceased. Thereupon 41.4 parts of calcium chloride was added with agitation until solution took place. The mixture was neutralized with concentrated ammonia, resulting in precipitation which was filtered by suction at 25° C. The precipitate was then washed with 100 parts of water, followed by 100 parts of alcohol and again dried. Thereupon the precipitate which constituted the calcium salt of pyrazine-2,3-dicarboxylic acid was slurried in the second mother liquor from the second filtration and washing described above. 95 parts of water were added followed by 72 parts of concentrated hydrochloric acid. The calcium salt dissolved except for slight turbidity and the reaction mixture was chilled to 5° C. and crystallization initiated. After crystallization was complete, the precipitate was filtered, washed with 25 parts of ice water and sun dried, the filtrate washed and saved for a second recycle.

The crude precipitate was dissolved in 60 parts of water at 75° C., filtered through a thin bed of filter aid, washed with 5 parts of hot water, and the wash added to the filtrate which was chilled to 5° C., resulting in precipitation, filtered by suction and washed with 25 parts of ice water. The filtrate and wash were combined to form another second mother liquor for recycling. The product pyrazine-2,3-dicarboxylic acid was dried at room temperature until the water of crystallization had effloresced. The recovery percentage was increased from 37.7 in the first part to 46.8 by recycling, an increase in yield of just under 25%. The recycling was continued giving over-all yields varying from 46 to 47%.

*Example 3*

26.2 parts of magnesium salt pyrazine-2,3-dicarboxylic acid was slurried in 63 parts of water at 30° C. Thereupon 21.2 parts of concentrated hydrochloric acid was added resulting in solution of the magnesium salt. The mixture was chilled to 0° C., crystallization initiated and maintained at the low temperature until crystallization was completed. The precipitate thereupon was filtered off by suction and washed with 10 parts of water at 0° C. to 3° C. The crude pyrazine-2,3-dicarboxylic acid was dried at room temperature and when tested for ash by ignition showed the presence of only a slight contamination by inorganic material.

The crude product was redissolved in 21 parts of hot water and recrystallized by chilling to 0° C., followed by washing with 10 parts of ice water, filtering dry by suction and drying at room temperature until the water of crystallization had effloresced. The yield of 64.8% of theory was obtained based on the magnesium salt. It should be noted that this yield is based on the magnesium salt and not as in Example 2 on the quinoxaline originally used to make the pyrazine-2,3-dicarboxylic acid salt. The purified material showed no visible ash on ignition and gave a negative test for ash with wet phenol-phthalein paper.

*Example 4*

33.3 parts of the zinc salt of pyrazine-2,3-dicarboxylic acid, containing 4 moles of water of crystallization was slurried with 63 parts of water. It was necessary to add concentrated hydrochloric acid to a total of 90 parts. The slurry became nearly clear and a new precipitate started to form quickly. Precipitation was completed by chilling to 5° C. and after precipitation was complete the product was filtered by suction, washed with 10 parts of water at 5° C., again sun dried and dried at room temperature. The recovery is 44.2%, based on the zinc salt used and a product was obtained which showed only a trace of ash on ignition.

*Example 5*

31.2 parts of the barium salt of pyrazine-2,3-dicarboxylic acid containing half a mole of water of crystallization was slurried with 63 parts of water and 17 parts of concentrated hydrochloric acid. A precipitate formed which was dissolved up with more hydrochloric acid to form a supersaturated solution. Thereupon crystallization was induced and completed by chilling to 0° C. in standing. The slurry was then filtered, the precipitate washed with 25 parts of chilled water, dried and recrystallized. A yield of somewhat over 41%, based on the original barium salt, was obtained. The product showed negligible ash on ignition.

I claim:

1. A process of producing pyrazine-2,3-dicarboxylic acid from a metal salt thereof with a group 2 metal, which comprises (1) slurrying said metal salt of pyrazine-2,3-dicarboxylic acid in water, (2) admixing said aqueous slurry thereof with sufficient strong mineral acid to decompose said metal salt and liberate the pyrazine-2,3-dicarboxylic acid therefrom, said mineral acid being capable of forming a water-soluble salt with said group 2 metal and the amount of water in the reaction mixture being sufficient to dissolve the metal salt of the mineral acid so formed, (3) cooling the aqueous solution of the pyrazine-2,3-dicarboxylic acid and water-soluble metal salt of the mineral acid so obtained to precipitate pyrazine-2,3-dicarboxylic acid therefrom without precipitating any substantial amount of the metal salt of the mineral acid and (4) recovering the so precipitated pyrazine-2,3-dicarboxylic acid.

2. A process according to claim 1 in which the mineral acid is hydrochloric acid.

3. A process according to claim 1 in which the group 2 metal salt is a magnesium salt.

4. A process according to claim 3 in which the mineral acid is hydrochloric acid.

5. A process according to claim 1 in which the group 2 metal salt is a magnesium salt and the mineral acid is sulfuric acid.

6. A process according to claim 1 in which the group 2 metal salt is calcium salt.

7. A process according to claim 6 in which the mineral acid is hydrochloric acid.

8. A process according to claim 1 in which the group 2 metal salt is a barium salt and the mineral acid is hydrochloric acid.

9. A process according to claim 1 in which the mineral acid is nitric acid.

10. A process of producing pyrazine-2,3-dicarboxylic acid from quinoxaline which comprises slurrying a group 2 metal salt of pyrazine-2,3-carboxylic acid in water, admixing the aqueous slurry thereof with sufficient strong mineral acid to decompose said metal salt and liberate the pyrazine-2,3-dicarboxylic acid, the said mineral acid being capable of forming a water-soluble salt with said group 2 metal and the amount of water in the reaction mixture being sufficient to dissolve the metal salt of the mineral acid so formed, cooling the reaction mixture to precipitate pyrazine-2,3-dicarboxylic acid, removing the precipitated pyrazine-2,3-dicarboxylic acid by filtration whereby a mother liquor is produced, oxidizing quinoxaline at elevated temperatures by an aqueous permanganate solution, removing insoluble manganese compounds, adding the mother liquor and sufficient salt of the group 2 metal which would transform the pyrazine-2,3-dicarboxylic acid compounds in the reaction mixture to salts of the group 2 metal in question, precipitating the group 2 metal salt of pyrazine-2,3-dicarboxylic acid and repeating the slurrying with water, addition of mineral acid, precipitation of pyrazine-2,3-dicarboxylic acid, recovery thereof from a mother liquor and reusing the mother liquor.

11. A process according to claim 10 in which the permanganate is potassium permanganate.

12. A process according to claim 11 in which the group 2 metal is calcium.

13. A process according to claim 12 in which the mineral acid is hydrochloric acid.

14. A process according to claim 10 in which the mineral acid is nitric acid.

15. In a process of producing pyrazine-2,3-dicarboxylic acid from quinoxalin wherein the quinoxalin is oxidized with an alkali metal permanganate in an aqueous medium and the aqueous reaction mixture so obtained is filtered to remove the manganese dioxide sludge and produce a filtrate containing the pyrazine-2,3-dicarboxylic acid, the improved cyclic process of recovering pyrazine-2,3-dicarboxylic acid from said filtrate which comprises (1) precipitating said acid therefrom as an insoluble salt thereof with a metal of group 2 and separating the precipitated metal salt thereof from the aqueous liquor, (2) slurrying the said insoluble metal salt of pyrazine-2,3-dicarboxylic acid in water, (3) admixing the aqueous slurry thereof with sufficient strong mineral acid to decompose said metal salt and liberate the pyrazine-2,3-dicarboxylic acid therefrom, the said mineral acid being capable of forming a water-soluble salt with said group 2 metal and the amount of water in the reaction mixture being sufficient to dissolve the metal salt of the mineral acids so formed, (4) cooling the aqueous solution of the pyrazine-2,3-dicarboxylic acid and metal salt of the mineral acid so obtained to precipitate pyrazine-2,3-dicarboxylic acid therefrom without precipitating any substantial amount of the metal salt of the mineral acid, (5) filtering the so cooled solution to remove the precipitated pyrazine-2,3-dicarboxylic acid and (6) returning the filtrate containing the metal salt of the mineral acid and residual pyrazine-2,3-dicarboxylic acid to step (1) wherein the pyrazine-2,3-dicarboxylic acid is precipitated as an insoluble metal salt thereof with a group 2 metal.

16. The process of claim 15 wherein the precipitation of the pyrazine-2,3-dicarboxylic acid as an insoluble metal salt thereof in step 1 is effected by acidifying the filtrate containing said acid with hydrochloric acid, adding sufficient of a group 2 metal chloride to supply at least a molar equivalent of the group 2 metal and neutralizing the mixture with concentrated ammonia whereby precipitating an insoluble metal salt of pyrazine-2,3-dicarboxylic acid from the so-treated mixture.

17. The process of claim 15 wherein said strong mineral acid is hydrochloric acid.

18. In a process of producing pyrazine-2,3-dicarboxylic acid from quinoxalin wherein the quinoxalin is oxidized with an alkali metal permanganate in an aqueous medium and the aqueous reaction mixture so obtained is filtered to remove the manganese dioxide sludge and produce a filtrate containing the pyrazine-2,3-dicarboxylic acid, the improved cyclic process of recovering the pyrazine-2,3-dicarboxylic acid from said filtrate which comprises (1) precipitating the said acid therefrom as an insoluble calcium salt thereof and separating the precipitated calcium salt from the aqueous liquor, (2) slurrying the calcium salt of pyrazine-2,3-dicarboxylic acid in water, (3) admixing the aqueous slurry thereof with sufficient strong hydrochloric acid to decompose said calcium salt and liberate the pyrazine-2,3-dicarboxylic acid therefrom, the amount of water in the reaction mixture being sufficient to dissolve the calcium chloride so formed, (4) cooling the aqueous solution of pyrazine-2,3-dicarboxylic acid and calcium chloride so obtained to precipitate pyrazine-2,3-dicarboxylic acid without precipitating any substantial amount of calcium chloride, (5) filtering the so cooled solution to separate the precipitated pyrazine-2,3-dicarboxylic acid and (6) returning the filtrate containing the calcium chloride and residual pyrazine-2,3-dicarboxylic acid to the step (1) wherein the pyrazine-2,3-dicarboxylic acid is precipitated as an insoluble calcium salt thereof.

References Cited in the file of this patent
Gabriel et al.: Ber. Deut. Chem. 40, 4851–2 (1907).